Nov. 25, 1952  H. DOTSON  2,619,018
IMPLEMENT ATTACHMENT FOR TRACTORS
Filed Nov. 12, 1947  3 Sheets-Sheet 1
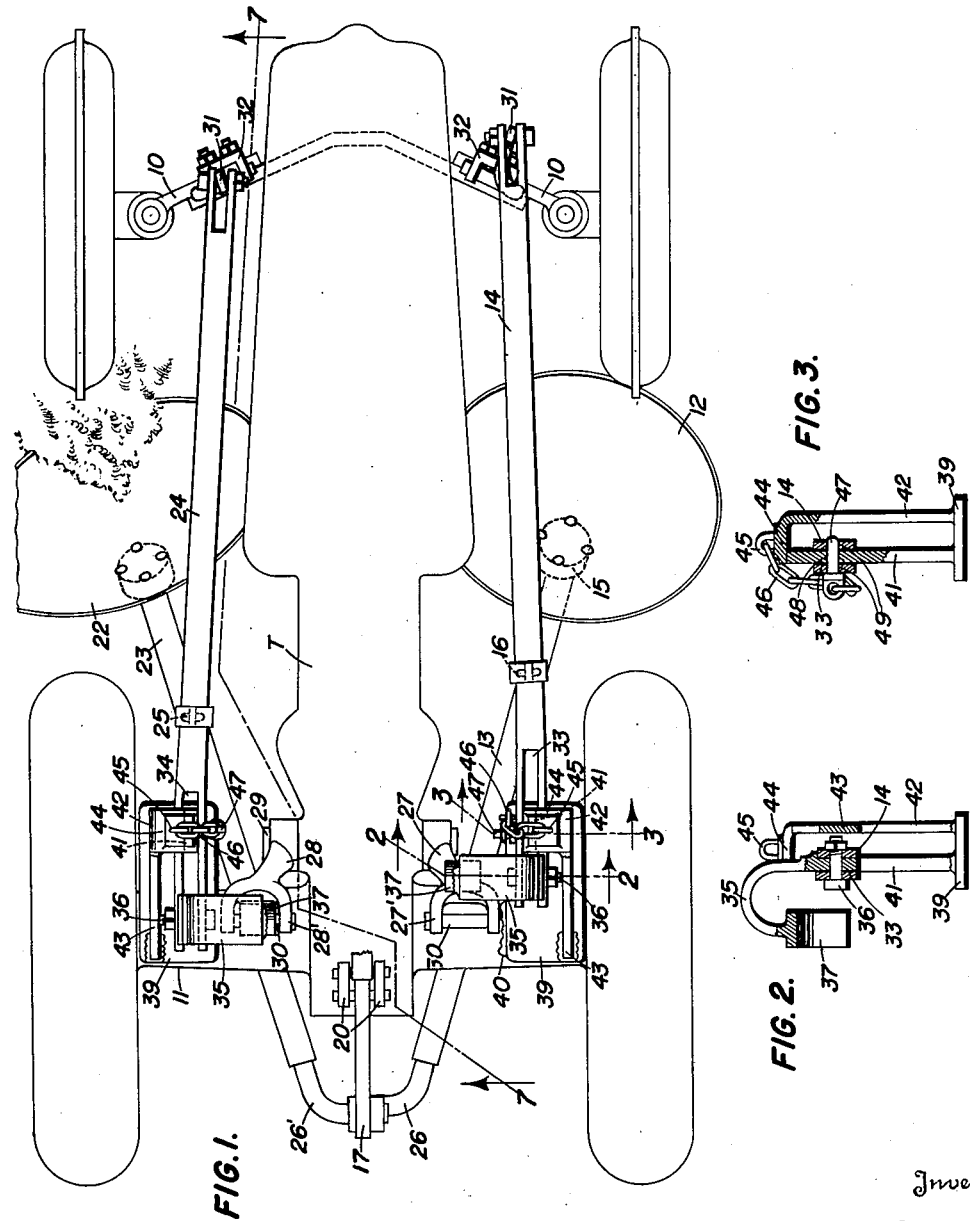
Inventor
HOMER DOTSON
By Pierce, Schiffler & Parker
Attorneys

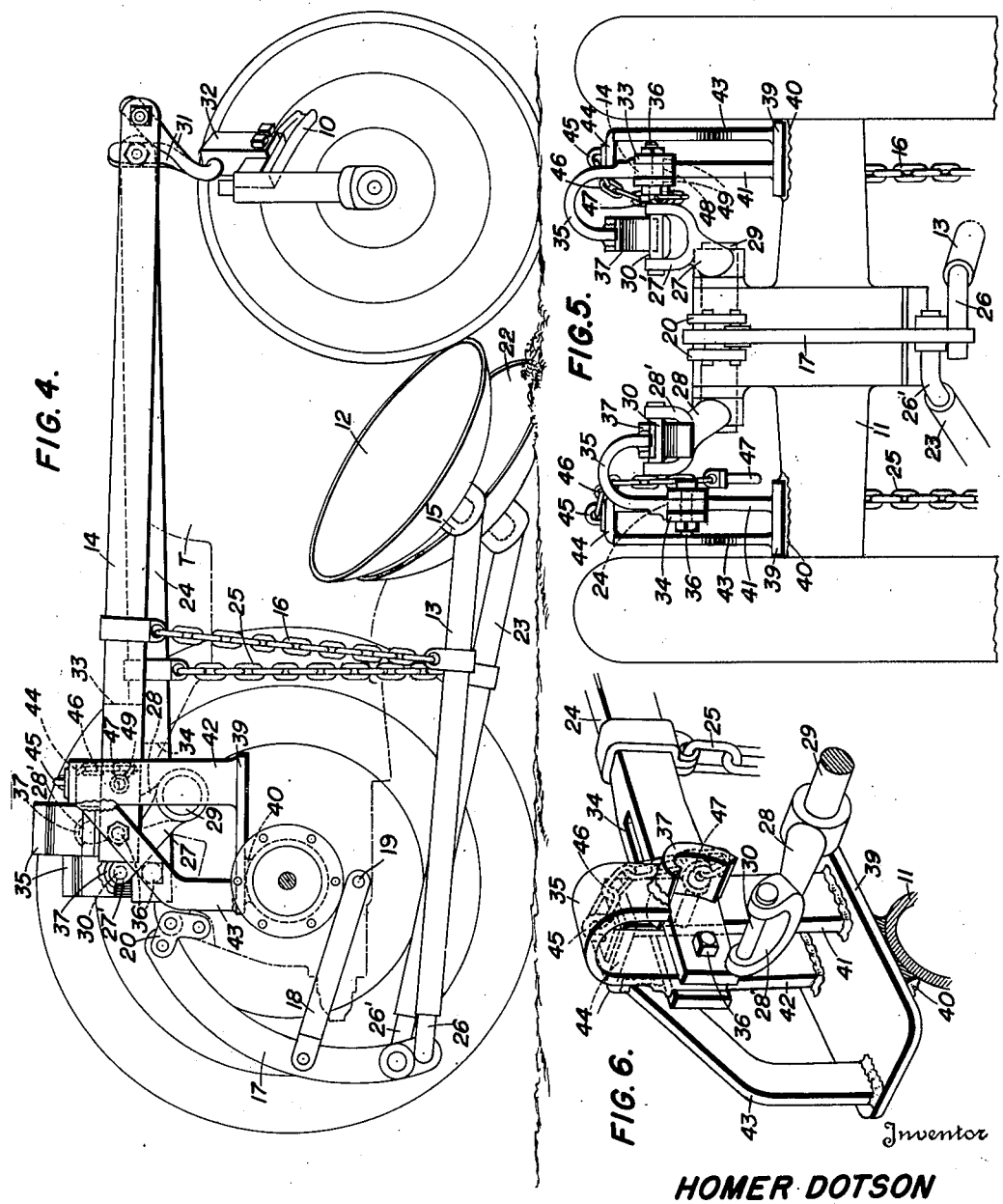

Nov. 25, 1952 — H. DOTSON — 2,619,018

IMPLEMENT ATTACHMENT FOR TRACTORS

Filed Nov. 12, 1947 — 3 Sheets-Sheet 3

Inventor
HOMER DOTSON
By Pierce, Scheffler & Parker
Attorneys

Patented Nov. 25, 1952

2,619,018

UNITED STATES PATENT OFFICE 2,619,018

IMPLEMENT ATTACHMENT FOR TRACTORS

Homer Dotson, Ringling, Okla.

Application November 12, 1947, Serial No. 785,391

4 Claims. (Cl. 97—50)

The present invention relates to an implement attachment for a tractor and in particular to those of the type in which the implement, such as for example a rotatable side disc plow used for terrace plowing is supported for operation between the front and rear wheels of the machine.

As shown in Reissue Patent 22,471, issued April 18, 1944, to H. Hollis, a pusher bar pivotally attached at its rear end to the frame of the machine and mounting the plow at its forward end is suspended by a chain from a lifting beam at a point intermediate the ends of the latter. The front end of the lifting beam is pivotally attached to the forward end of the machine frame and the rear end is coupled to a lifting arm by which the beam can be raised or lowered as desired to thereby correspondingly raise or lower the plow. When fully elevated, the plow occupies a position entirely clear of the ground; when lowered, the plow will enter the ground and the plowing depth can be governed by adjusting the position of the lifting arm. As mentioned in the Hollis patent, the lifting arm is actuated by a hydraulic ram which can be of the type shown in U. S. Patent No. 2,118,180, issued May 24, 1938, to H. G. Ferguson.

In both the Hollis and Ferguson patents, the lifting arm is permanently connected to the rear end of the lifting beam by means of a shackle. This has proven to be quite a drawback. From the foregoing description, it will be obvious that the lifting arm has two functions; it forms the rear support for the beam at all times regardless of whether the plow is in use or not; and it also serves to raise or lower the beam and hence the plow suspended below it. It is thus quite evident that no other ground implement such as a bulldozer blade, or a slip can be attached to the tractor machine and raised or lowered by the ram powered lifting arm unless the lifting beam and plow are removed entirely from the tractor. This is an operation which has been found to require as much as an hour's time. Dirt work in general and terracing in particular involves a considerable amount of grading and filling; it is often thus necessary to remove the plow, attach the bulldozer blade for use, then later reattach the plow. The total time loss which could otherwise be put to useful work is thus considerable.

The present invention enables the operator to free the ram powered lifting arm from the lifting beam in a moment's time for use with other implements and without the necessity for removing the lifting beam from the tractor. In the course of an average day's work, this may well save from one to several hours time that otherwise would be lost.

The invention also permits the installation of a second or "left-handed" disc plow at the left side of the tractor in addition to the single "right-handed" plow customarily used, the operator thus being able to switch from one plow to the other without delay. With only one disc plow, the operator, in working upon "channel" type farm terraces where the soil must all be thrown in the same direction to best conserve it, must start to plow at one end of the terrace, plow to the other end, then raise the plow and return to the starting point to plow again. With two plows supported in accordance with this invention, the operator is enabled to plow in both directions of travel and still throw the soil in only one direction. The savings in time thus effected is obvious. In fact field tests of the improved machine using two plows have shown that one mile of channel type terrace can now be completed in ten hours' operating time whereas twenty hours were required previously using only one plow.

In its broadest concept the invention can be said to reside in providing an auxiliary stationary support for the rear end of the lifting beam to hold the latter and hence the plow in an elevated, non-operating position, in addition to the support normally supplied by the power operated lifting arm when the plow is in use, together with means for quickly changing over from one support to the other. When the rear support for the beam is shifted from the lifting arm to the auxiliary support, the former thus becomes available for use with any other attachment that requires the aid of the power operated lifting arm.

Another object is to provide an auxiliary stationary support for the lifting beam that also serves as a guide and brace for the rearward portion of the lifting beam when the plow is in use.

Another object is to provide an improved coupling device between the power operated lifting arm and the rear end of the lifting beam that engages and disengages automatically as the lifting arm moves towards and away from the beam respectively.

The foregoing and other objects and advantages to be derived from the invention will become readily apparent from the following detailed description and accompanying drawings that illustrate a preferred construction of the invention as applied to a self-propelled terracing machine having a pair of terracing disc plows attached thereto.

In the drawings:

Fig. 1 is a plan view of the improved terracing machine, the right disk plow being up, the left disk plow down;

Fig. 2 is a cross section on the line 2—2 of Fig. 1, illustrating the attachment of the member by which the lifting beam is coupled to the lifting arm;

Fig. 3 is a cross section on the line 3—3 of Fig. 1, illustrating how the lifting beam is held in its elevated and inoperative position on the auxiliary support;

Fig. 4 is an elevation of the right side of the machine, the front and rear wheels on that side being omitted;

Fig. 5 is a rear elevation of the machine;

Fig. 6 is a perspective view of the left bracket assembly, the lifting beam being held in its elevated position and the coupling being separated from the adjacent lifting arm;

Fig. 8 is a diagram illustrating the two-way plowing herein referred to.

Figure 7:
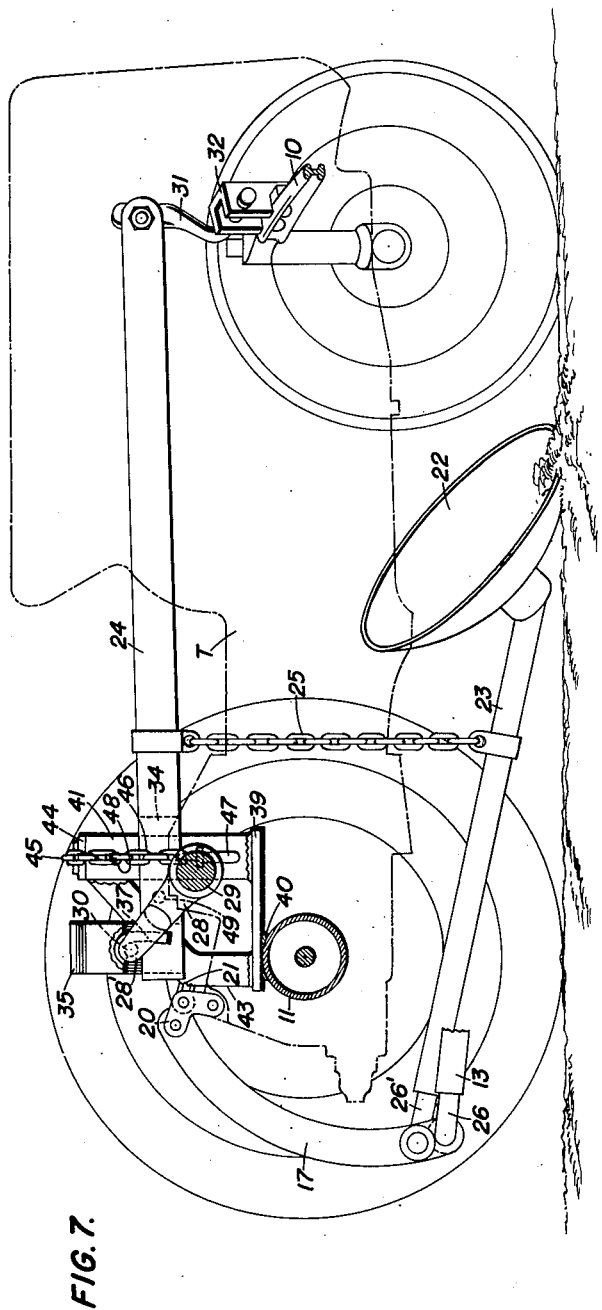
Fig. 7 is a longitudinal section of the machine, taken substantially on line 7—7 of Fig. 1.

Referring now to the drawings, the tractor designated by the general reference character T is seen to include the conventional front axle 10, a rear axle housing 11, a right handed disk plow 12 carried on the right side of the tractor at the forward end of a pusher bar 13 in a socket 15, and a lifting beam 14. The shank of plow 12 is rotatable in socket 15 and a chain 16 connects the pusher bar to the lifting beam at a point intermediate the ends of the latter.

The rear end of pusher bar 13 is attached by an elbow 26 to the lower end of an arcuately shaped thrust link 17 that is pivoted intermediate its ends to a bail frame 18 that in turn is pivotally connected at 19 to the tractor frame. The upper end of link 17 is joined to a pair of bell cranks 20 that are coupled at 21 (see Fig. 7) to a rod (not shown) which abuts one end of a master control spring as disclosed in the Ferguson Patent 2,118,180.

On the left side of the tractor frame a left-handed disk plow 22 is mounted in the same manner as plow 12 at the forward end of pusher bar 23 that is hung from the left hand lifting beam 24 by chain 25. The rear end of pusher bar 23 is attached to the arcuate link 17 by elbow 26' at a point immediately above elbow 26.

The front ends of the lifting beams 14 and 24 are pivotally secured to cranks 31 which are rotatably mounted in castings 32 secured to the front axle 10. This type of mounting permits the slight longitudinal displacement of beams 14, 24 necessary when the rear ends of the beams are raised and lowered.

It has been previously explained that the disk plows 12 and 22 are raised and lowered by raising and lowering the rear ends of the lifting beams. For doing this, a hydraulic ram is used. The ram itself is not shown but may be of the type disclosed in the Ferguson Patent 2,118,180. The ram piston delivers rotative power to a transverse drive shaft 29 having right and left hand lifting arms 27, 28 secured thereto at its ends. The outer ends of the lifting arms terminate in forks 27', 28' that are each bridged by a stud 30.

Referring now to Fig. 1 in particular, it will be seen that rear end of lifting beam 14 terminates in a fork 33 and lifting beam 24 has a similar forked rear end 34. At the outer end of each of these forked ends, an arched plate 35 is secured therebetween by means of a bolt 36. To each of the plates 35 is attached such as by welding an open, tailed socket 37 that receives the pin 30 at the outer end of each of the ram powered lifting arms 27, 28. Thus when pin 30 is coupled to the socket 37, the rear ends of the lifting beams 14, 24 will raise and lower as the lifting arms 27, 28 rise and fall.

It was stated at the outset that the main objective attained by the invention is the provision of an auxiliary support associated with the rear end of each of the lifting beams so that either or both of the latter can be selectively held elevated in a non-operating position. Thus in the present embodiment of the invention, one of the lifting beams would normally be held in an elevated position while the other was in use, and vice versa, when the machine is used for terrace plowing. Or if desired, both lifting beams can be held elevated and the lifting arms 27, 28 freed for use with some other attachment such as a bulldozer blade.

The auxiliary support for the rear end of each lifting beam is comprised of a plate 39 fixed to the outer end of the axle housing 11 such as by welding at 40. Upstanding upon each plate are a pair of spaced upright members 41, 42 that straddle one side of the forked end of each lifting beam. The upper end of member 42 braced by a diagonal strut 43 terminates in a horizontal projection 44 to which is secured an eye 45 that anchors one end of a chain 46, and a pin 47 is attached to the free end of the chain. Aligned holes 48 are drilled horizontally through the uprights 41, near the top and corresponding holes 49 are drilled through the forked ends of the plow beams 14, 24.

To secure either of the lifting beams in their elevated position, one need only to raise the rear end of the beam by the lifting arm associated therewith until the holes 49 in the beam register with the holes 48 in the upright members and then insert the pin 47 which is of course made long enough to bridge the forked end of the beam. When this has been done, the lifting arm can be lowered, the arm being freed automatically by virtue of the "open" type coupling afforded by open socket 37 and pin 30.

In Fig. 5, the right hand lifting beam 14 is shown as being held in its elevated position by the auxiliary support while the left hand lifting beam 24 is shown coupled with the lifting arm 28. Of course, lifting beam 24 could likewise be elevated and secured to its auxiliary support. The auxiliary supports also function as a guide and brace for the rear ends of the lifting beams 14, 24 to assure proper alignment of the pin and socket elements of the open coupling between the beam and lifting arms.

Figure 8:
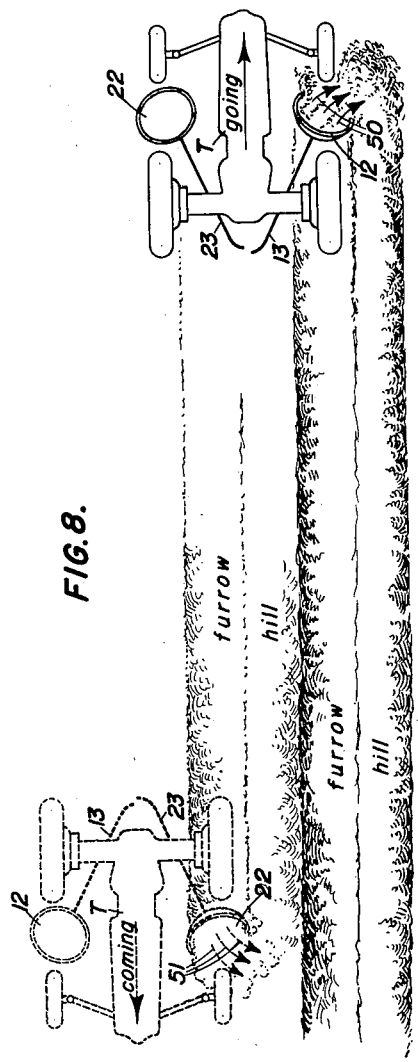

Figure 8 illustrates the use of the machine equipped with two disc plows for terrace plowing. In going in one direction across the field, the right plow is let down so that the dirt is thrown to the right (arrows 50). When the end of the field is reached, the operator need only to switch from the right plow 12 to the left plow 22 in the manner described above, and in coming back, the dirt will again be thrown in the same direction (arrows 51).

In conclusion, it will be understood that while in accordance with the patent statutes I have described and shown a preferred construction of a plowing machine embodying the invention, various changes in the specific construction and arrangement of the parts illustrated may be made without departing from the spirit and scope of the invention as expressed in the appended claims.

I claim:

1. In an implement attachment for a tractor having a power actuated lifting arm member, the combination comprising, a pusher bar extending longitudinally along the body of the tractor, means pivotally connecting the rear end of said pusher bar to said tractor for swinging movement in a substantially vertical plane, an implement attached to the forward end of said bar, a lifting beam extending longitudinally along the body of the tractor above said pusher bar, the rear end of said lifting beam terminating in a forked portion, means pivotally connecting the forward end of said beam to said tractor for swinging movement in a substantially vertical plane, means interconnecting said pusher bar and lifting beam intermediate their ends, a driving connection between the rear end of said beam and said lifting arm member for elevating said lifting beam and hence also said pusher bar upon actuation upward of said lifting arm member, a support member upstanding upon said tractor adjacent the rear end of said lifting beam and which extends through the forked portion thereof, and a removable pin insertable through said support member and which cooperates with said forked portion when so inserted to hold said beam in its elevated position, said driving connection being self disengageable to thereby permit said lifting arm member to be lowered when said lifting beam has been secured in its elevated position to said support.

2. An implement attachment as defined in claim 1 wherein said forked portion of said lifting beam and said support member are provided with aligned transverse apertures through which said pin is insertable.

3. An implement attachment as defined in claim 1 wherein the driving connection between the rear end of said beam and said lifting arm member is constituted by an open socket and coupling pin one of which is carried by said beam and the other by said lifting arm member.

4. In an implement attachment for a tractor having a power actuated lifting arm, the combination comprising, a pusher bar extending longitudinally along the body of the tractor, means pivotally connecting the rear end of said pusher bar to said tractor for swinging movement in a substantially vertical plane, an implement attached to the forward end of said bar, a lifting beam member extending longitudinally along the body of the tractor above said pusher bar, means pivotally connecting the forward end of said beam member to said tractor for swinging movement in a substantially vertical plane, means interconnecting said pusher bar and beam member intermediate their ends, a driving connection between the rear end of said beam member and said lifting arm for elevating said beam member and hence also said pusher bar upon actuation of said lifting arm, a support member upstanding upon the tractor adjacent the rear end of said beam member, one of said members being provided with a forked portion through which a shaft portion provided on the other member extends, and a removable pin insertable through one of said portions and which cooperates with the other of said portions when so inserted to hold said beam member in its elevated position, said driving connection being self-disengageable to thereby permit said lifting arm to be lowered when said beam member has been secured by said pin in its elevated position on said support member.

HOMER DOTSON.

REFERENCES CITED

The following references are of record in the file of this patent:

UNITED STATES PATENTS

| Number | Name | Date |
|---|---|---|
| Re. 22,471 | Hollis | Apr. 18, 1944 |
| 1,922,222 | Strandlund et al. | Aug. 15, 1933 |
| 2,283,378 | Liner | May 19, 1942 |
| 2,297,301 | Hipple | Sept. 29, 1942 |
| 2,324,840 | Hipple | July 20, 1943 |
| 2,381,588 | Hall | Aug. 7, 1945 |
| 2,425,806 | Ing | Aug. 19, 1947 |
| 2,532,577 | Silver et al. | Dec. 5, 1950 |